Nov. 12, 1957  G. E. BOCK ET AL  2,812,726
AXLE STEERING MECHANISM
Filed March 16, 1956  3 Sheets-Sheet 1
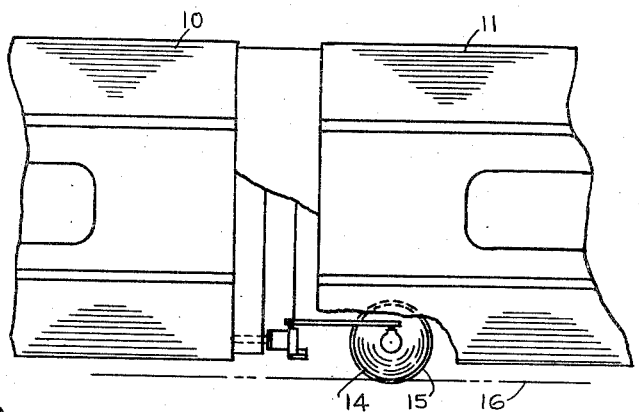
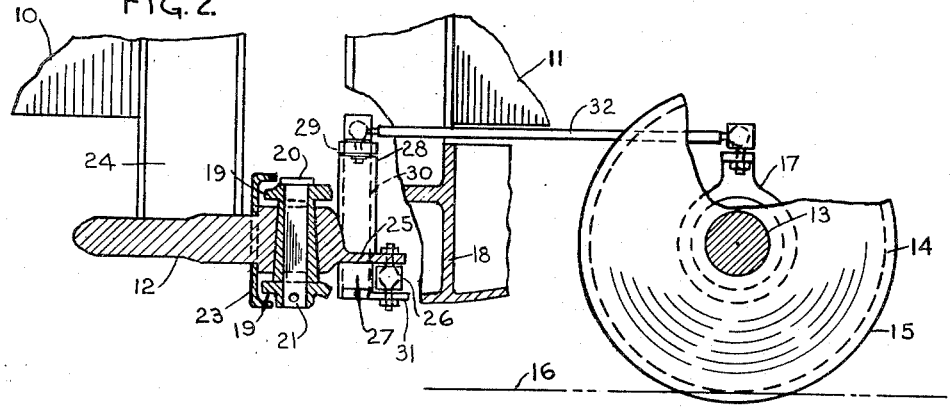
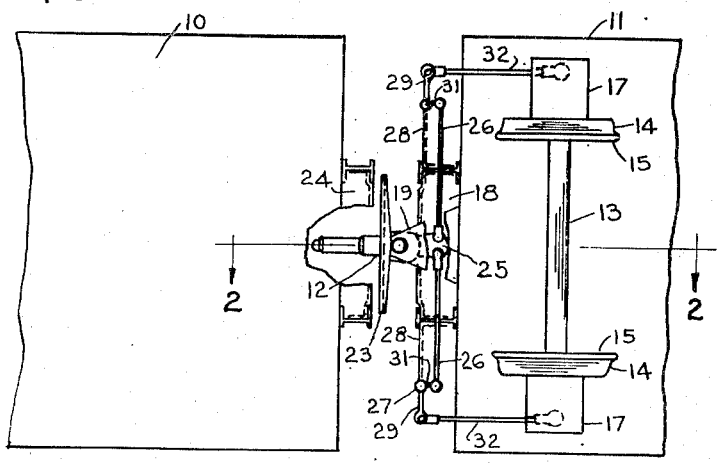
INVENTORS
GEORGE E. BOCK &
JACK E. GUTRIDGE
BY Cromwell, Greist & Warden
ATTORNEYS Nov. 12, 1957 — G. E. BOCK ET AL — 2,812,726
AXLE STEERING MECHANISM
Filed March 16, 1956 — 3 Sheets-Sheet 2

INVENTORS
GEORGE E. BOCK &
JACK E. GUTRIDGE
BY Cromwell, Greist & Warden
ATTORNEYS

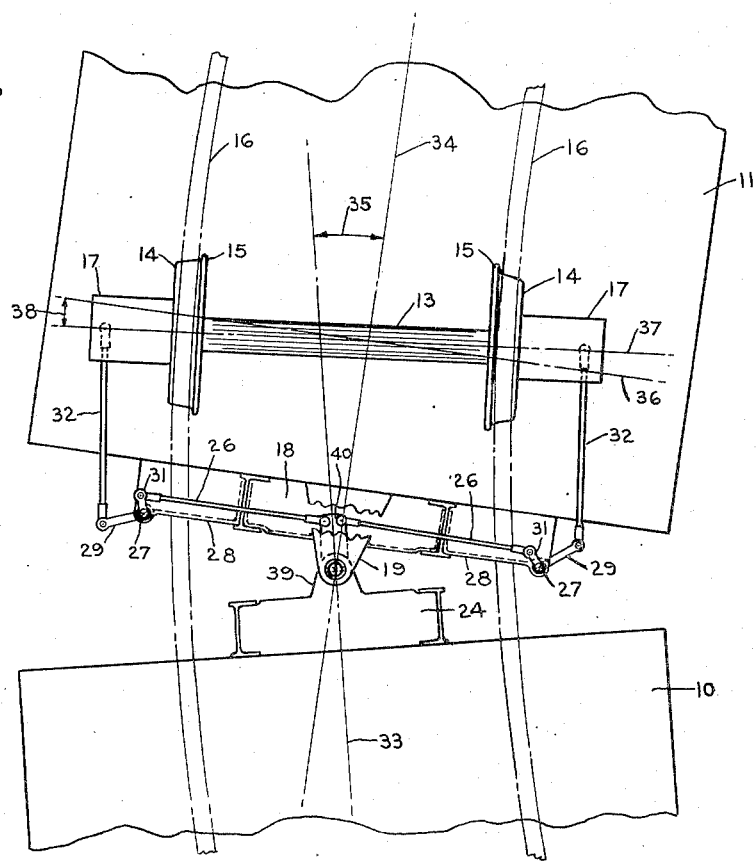
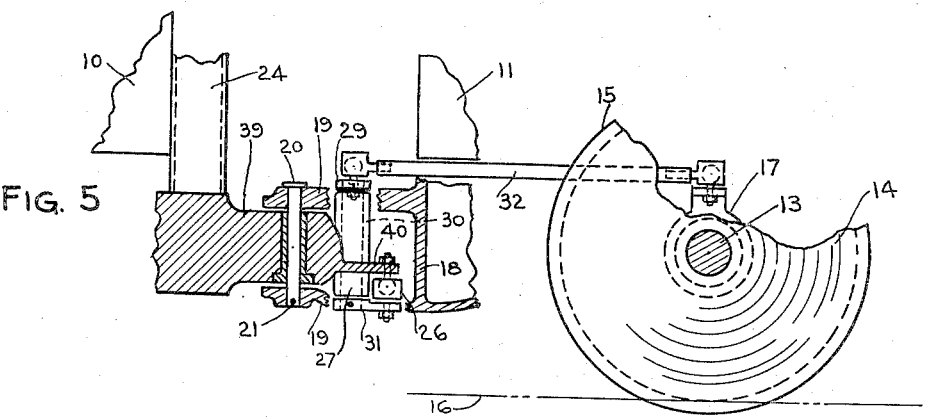

ent Office 2,812,726
Patented Nov. 12, 1957

2,812,726

AXLE STEERING MECHANISM

George E. Bock, Munster, and Jack E. Gutridge, Dyer, Ind., assignors to Pullman-Standard Car Manufacturing Company, Chicago, Ill., a corporation of Delaware Application March 16, 1956, Serial No. 571,864

16 Claims. (Cl. 105—4)

The present invention relates generally to an axle steering mechanism for use with articulated vehicles, particularly lightweight, high speed railway cars of the single axle variety which are interconnected in load-bearing support. More specifically, the invention is directed to a new and improved axle steering mechanism for use with articulated vehicles whereby variations in lateral angularity of one vehicle relative to another are translated through the steering mechanism to steer the axle of one of the vehicles in a compensating manner, the variations arising when the articulated vehicles negotiate a curve.

While the axle steering mechanism of the present invention is adapted for use with many different types of articulated vehicles where it is desired to transmit relative change of direction of one vehicle to an axle of a second vehicle, the mechanism is particularly adapted for use with articulated railway cars of the lightweight type which are interconnected in load-bearing support and which are provided with single axles mounted near one of the ends of each of the cars. As a result of the particular adaptation of the steering mechanism to railway cars of the lightweight, single axle variety the following description will be directed toward the use of the steering mechanism with respect to such cars although it should be understood that the description is merely illustrative of one use of the steering mechanism and it is not intended to thereby limit the scope of the present invention in this respect.

In the operation of lightweight, high speed trains which include a plurality of cars each provided with a single axle near one end thereof and having the unsupported end in load-bearing relation with an end of an adjacent car independently supported by its single axle, it is particularly desired to improve the operation of the train at high speeds when the same is negotiating a curve. An axle steering mechanism allows a railway car to readily negotiate a curve at high speeds as it functions to steer the axle of the car into the curve thereby eliminating the tendency of the wheel flanges of the leading axles to climb the rails. This tendency is particularly present in the front axles of a railway car as any axle mounted toward the rear of the car is partially steered by the car itself as it rounds a curve. In the operation of lightweight trains composed primarily of single axle cars, it is of course desirable to operate such trains in either direction and in the event that the direction of operation places the single axle near the front of the car it is particularly advantageous to provide the axle with a steering mechanism thereby greatly increasing the efficiency of operation during the negotiation of curves at high speeds. The single axle should be steered to an extent that the wheel flanges are substantially tangential to the inner surfaces of the rails thereby eliminating the tendency of the outer flange to climb the outer rail. Steering of this nature provides a more comfortable ride, reduces operational noises and allows the train to be operated at much higher speeds without danger of derailment.

Different steering mechanisms have been designed and tested and in many instances have been found to be undesirable from the standpoints of functioning efficiency, cost and maintenance. Steering mechanisms will in many instances interconnect the rear end of the leading car with the foremost axle of the following car to thereby transmit lateral relative change of direction of the leading car with respect to the following car to the axle of the latter to steer the same. Arrangements of this nature have been found to be undesirable in that the complete coupling or uncoupling of adjacent cars in the railroad yard is hindered by the necessity of additionally connecting or disconnecting the steering mechanism. To overcome this disadvantage efforts have been made to design steering mechanisms utilizing parts carried wholly by the car provided with the axle to be steered and depending on the coupling arrangement between the adjacent cars to transmit the relative movement between the cars to the steering mechanism and ultimately to the axle. In many instances the steering mechanisms of the last mentioned variety are of complicated design or are by necessity mounted in comparatively inaccessible places thereby complicating maintenance as well as installation and adjustment.

With the advent of lightweight trains consisting of single axle cars interconnected in load-bearing support, the provision of shop-connected units which are not intended to be uncoupled during use has become widespread. With the use of shop-connected units it is possible to provide the interconnected cars with permanently mounted axle steering mechanisms which may be cooperatively carried by adjacent cars. Due to the feature of permanent connection of the adjacent cars, it is unnecessary to disturb the mounting of the steering mechanism. However, steering mechanisms have not been standardized in design to the extent that they may be used with both shop-connected and yard-coupled cars without the necessity of utilizing different elements with each form of steering mechanism. As a result it is necessary to provide two different forms of steering mechanisms, one which may be used with shop-connected cars and another which is designed for use with yard-coupled cars, the latter form being specially designed to be wholly carried by a single car.

For satisfactory operation it is often desirable to minimize the effect of car body roll on the steering mechanism. This usually requires a complex steering system. Lateral sway or roll of the car body is present to a certain extent even though the car is traveling along a straight portion of roadbed during which time positive steering of the axle is generally undesired other than to maintain it normal to the longitudinal center line of the car. However, in certain instances it is preferred to provide some degree of steering on the straight-away to stabilize the car body. To provide a steering mechanism capable of functioning for variable uses of this nature tends still further to overcomplicate the steering system.

It is an object of the present invention to provide a new and improved axle steering mechanism for use with articulated vehicles such as lightweight, high speed trains composed of a number of articulated single axle cars, which steering mechanism is highly efficient in operation, inexpensive to manufacture, of simplified design, capable of being readily installed and maintained and is adapted to be mounted with respect to a vehicle in a readily accessible location.

Another object is to provide a new and improved axle steering mechanism which is readily adapted for use with shop-connected railway cars as well as yard-coupled cars without the necessity of rearranging its associated elements or using specially designed parts.

Still another object is to provide an improved steering mechanism which is normally substantially unaffected in its operation by body roll of vehicles with which it is associated while being adapted for use with a car body to steer the axle on straight-away operation sufficiently to substantially stabilize the car body if steering is desired.

Other objects not specifically set forth will become apparent from the following detailed description made in conjunction with the drawings wherein:

Fig. 1 is a fragmentary schematic side elevation of the coupled ends of two single axle railway cars provided with the steering mechanism of the present invention;

Fig. 2 is an enlarged fragmentary vertical section of the steering mechanism of Fig. 1 taken along line 2—2 of Fig. 3;

Fig. 3 is a fragmentary bottom plan view of the steering mechanism of Fig. 1;

Fig. 5 is an enlarged fragmentary vertical section similar to Fig. 2 illustrating the mounting of the steering mechanism with respect to shop-connected single axle railway cars;

Fig. 6 is an enlarged bottom plan view similar to Fig. 4, illustrating the operation of the steering mechanism of Fig. 5.

Figure 4:
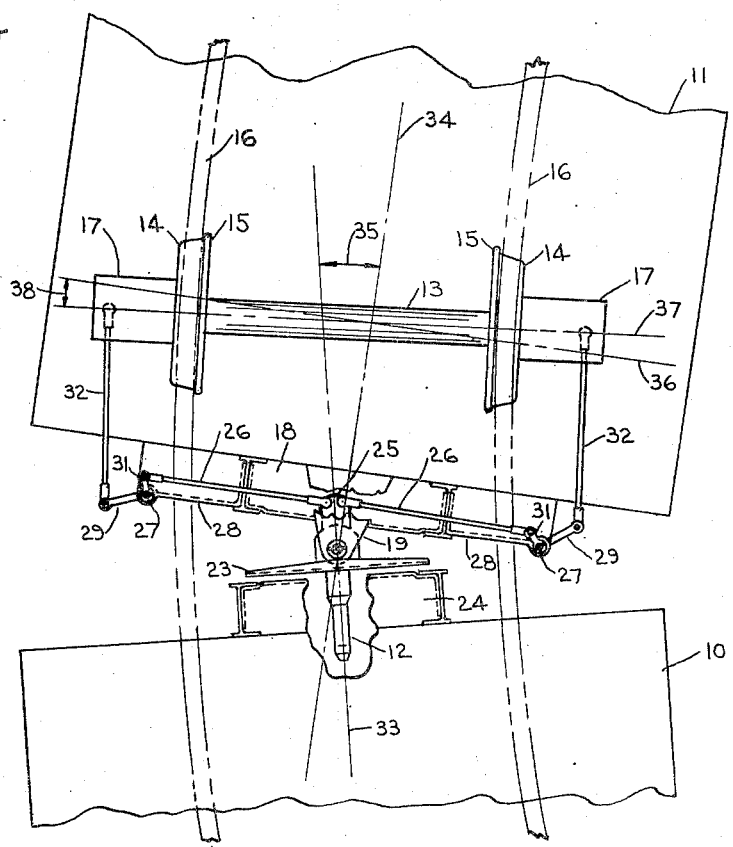
Fig. 4 is an enlarged bottom plan view similar to Fig. 3, illustrating the operation of the steering mechanism upon the negotiation of a curve by the coupled single axle cars.

The steering mechanism of the present invention may be used with interconnected single axle cars which are either shop-connected or capable of being coupled and uncoupled during their use. Under either circumstance the steering mechanism utilizes the same elements in their same operative relation and, regardless of the type of coupling arrangement used, the steering mechanism is standardized. It is, therefore, unnecessary to make use of special elements, regardless of the circumstances, to operatively associate the steering mechanism with the coupled cars.

The steering mechanism is capable of functioning in response to lateral relative movement between the coupled cars to steer an axle associated therewith so that the longitudinal axis of the axle is maintained at substantially right angles to tangents of the inner vertical surfaces of the rails. The steering mechanism is furthermore formed from various elements which are readily accessible for maintenance purposes and these elements are interconnected in such a manner as to allow adjustment to the steering mechanism during continued operation of the same to maintain its efficient functioning over an extended period of time.

Figs. 1–3 generally illustrate adjacent end portions of yard-coupled railway cars 10 and 11 which may be of any suitable construction, each being of the high speed, lightweight variety provided with but a single axle. The car 10 has its unsupported end interconnected with the car 11 by means of a coupling arrangement including male and female coupling members, the male coupling member 12 being shown. The supported end of the car 11 is provided with a single axle 13 which carries laterally spaced wheels 14 provided with wheel flanges 15 cooperating in the known manner with the inner vertical surfaces of laterally spaced rails 16 shown in broken lines. Outwardly of the wheels 14 are journal boxes 17 which mount the car body on the axle 13. Any suitable car body suspension means may be used as long as each axle is free to pivot relative to the car body mounted thereon to allow each axle to be steered.

The car 11 is provided with a coupling mounting portion 18 which has vertically spaced ears 19 extending outwardly therefrom and receiving therebetween a portion of the male coupling member 12. A pin 20 is received through aligned holes in the ears 19 and the coupling member 12 and is held in place by a fastening pin 21. The pin 20 pivotally mounts the male coupling member 12 on the car 11. The male coupling member 12 carries a laterally extending coupling beam 23 for interconnecting car servicing lines, such as for air and water, and is detachably received by a female coupling member (not shown) carried by a coupling member mounting portion 24 of the car 10.

Integral with the male coupling member 12 and extending toward the car 11 is an arm 25 which moves about the pivot point established by the pin 20 in response to lateral relative movement between the cars 10 and 11. The arm 25 is interconnected with the innermost ends of oppositely directed, laterally extending steering links 26. The interconnection between the arm 25 and the steering links 26 is such as to allow relative pivotal action and preferably is established by the use of ball and socket joints as shown. The outermost ends of the steering links 26 are pivotally connected to steering levers 27 in the form of bell cranks which are carried by transversely extending mounting portions 28 attached to the car 11.

Each of the bell cranks 27 are of similar design being provided with an upper crank arm 29 integral with a vertical rod portion 30 which in turn carries a lower crank arm 31, the outer end of which is pivotally connected to an outermost end of a steering link 26. The crank arms 29 and 31 extend radially from the post 30 and are positioned at an angle of 90° to one another. The upper crank arms 29 are pivotally connected at the outermost ends thereof with the ends of steering rods 32 which in turn are pivotally attached to the journal boxes 17. This completes the steering mechanism and it can be readily seen that movement of the arm 25 relative to the car 11 will cause the various elements of the steering mechanism to move the axle 13 relative to the car 11.

Reference is now made to Fig. 4 to describe the operation of the steering mechanism in connection with its use on yard-coupled cars having male and female coupling interconnections. As shown in this figure the interconnected cars 10 and 11 are in the process of negotiating a curve in the track 16 and for purposes of explanation the car 10 will be considered to be the leading car while the car 11 is the following car. However, it should be understood that the steering mechanism will function in the same manner in the event that the car 11 is the leading car and the car 10 is the following car.

As the car 10 enters the curve its center line 33 is moved out of coinciding relationship with the center line 34 of the car 11. The male coupling member 12 being connected to the car 10 and being pivotally mounted on the car 11 follows the car 10 and its integral arm 25 pivots proportionally. As a result the steering links 26 are moved relative to the car 11 and this motion transmitted through the crank arms 31 rotates the bell cranks 27. Both of the bell cranks 27 are caused to rotate in a counterclockwise direction and the extent of rotative movement is transmitted through the crank arms 29 to the steering rods 32. As a result, the right-hand steering rod 32, as viewed in Fig. 4, is moved toward the car 11 and forces the end of the axle 13 associated therewith to move rearwardly. The left-hand steering rod 32 is moved toward the car 10 and pulls the end of the axle 13 associated therewith forwardly to rotate the axle in a counterclockwise direction to an extent that it follows the curvature of the rails 16. The angle of displacement existing between the center lines 33 and 34 of the cars 10 and 11, as evidenced by the angle 35, is translated to the axle 13 to an extent that the axle is rotated counterclockwise in a fixed ratio with respect to the angular displacement of the cars. The rotative angular displacement of the axle 13 is measured between the normal center line 36 and the new center line 37 and is designated by the numeral 38. The angle 38 is less than the angle 35 to maintain the longitudinal center line of the axle 13 normal to tangents of the inner vertical surfaces of the rails 16. The relation between the angles is governed by the distance between the pivot point of the cars and the axle being steered. As a result the wheel flanges 15 do not tend to climb the rail 16 and the axle 13 is steered around the curve in the track in a safe and quiet manner.

In order to maintain a desired amount of steering action the crank arms 31 are short in length as compared with the crank arms 29. This arrangement maintains a constant ratio so that the relatively slight movement of the steering links 26 results in sufficient movement of the steering rods 32 to promote proper turning of the axle 13.

The foregoing description has dealt with the use of the axle steering mechanism of the present invention in trains formed from yard-coupled cars. It will be noted that under these circumstances the steering mechanism is wholly sustained by a single car and this car, such as car 11, may be readily disconnected from an adjacent car by simply disconnecting the male and female coupling members without the necessity of disconnecting any elements of the axle steering mechanism.

In the instance where articulated railway cars are shop-connected, the axle steering mechanism described above is fully capable of being mounted in a similar manner without the necessity of rearranging any elements thereof or utilizing specially designed parts. Figs. 5 and 6 illustrate this feature and as the elements making up the axle steering mechanism are the same as previously described, like reference numerals for like parts are utilized. Referring particularly to Fig. 5, the car 10 is provided with a coupling flange 39 which is pivotally connected by means of the pin 20 between the ears 19 of the car 11. The outermost end of the coupling flange 39 is provided with an outwardly directed arm 40 which, being integral with the coupling flange 39, moves with the same relative to the car 11 when the car 10 negotiates a curve. The arm 40 has pivotally attached thereto the inner ends of the steering links 26. Relative movement between the cars 10 and 11 is transmitted through the arm 40, the steering links 26, the steering levers 27, the steering rods 32 to the axle 13 of the car 11.

The steering mechanism when mounted with respect to shop-connected cars operates in exactly the same manner as previously described in connection with Figs. 1–4. This operation is illustrated in Fig. 6 and it will be noted that when the car 10 enters the curve, the flange 40 follows lateral movement of the car 10 with respect to the car 11 and the steering links 26 function to operate the axle steering mechanism to pivot the axle 13 in a counterclockwise direction to an extent related to the displacement of the center lines 33 and 34 of the cars 10 and 11.

Figure 7:
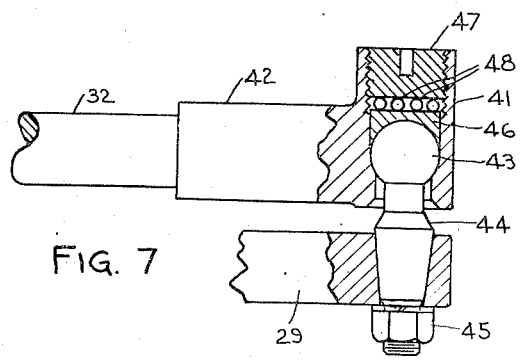
Fig. 7 is an enlarged fragmentary partial section of a ball and socket joint of the type preferably used in interconnecting the various elements of the steering mechanism.

The pivotal connections maintained between the various linkages used in the axle steering mechanism are of particular importance and, as previously described, these connections are formed from ball and socket joints. Fig. 7 illustrates a typical ball and socket joint connection formed from parts of known design and operative relation. The ball and socket joint of Fig. 7 consists of a ball housing or socket 41 which is formed integral with a rod end 42 of a steering mechanism element such as a steering rod 32. The housing 41 internally receives a ball 43 integrally mounted on a stem 44 extending downwardly through a bottom opening in the housing 41. The lower portion of the stem 44 is cone-shaped and is received within an aperture in a second element such as a bell crank arm 29. The lowermost portion of the stem 44 extends below the bottom surface of the bell crank arm 29 and is externally threaded to receive a nut 45 in engagement therewith to thereby clamp it in wedging engagement with the bell crank arm 29. The top surface of the ball 43 within the socket 41 is in contact with a bearing 46 which is urged downwardly by an adjustment screw 47 threadedly received in the top opening of the socket 41. Intermediate the bottom surface of the screw 47 and the top surface of the bearing sleeve 46 are positioned a plurality of ball bearings 48.

While any suitable pivotable joint may be used in interconnecting the various relatively movable elements of the axle steering mechanism it has been found preferable to use a plurality of ball and socket joints of the type described in connection with Fig. 7. Upon extended operation of the axle steering mechanism, wear of the various elements forming the joints affects the efficiency of operation. Compensation can be made as to the wear created between the relatively movable parts of the ball and socket connections by advancing the screws 47. In this manner the elements of the steering mechanism can always be maintained in proper interconnected relation by uncomplicated and inexpensive maintenance.

Universal pivotal interconnection between the various elements of the steering mechanism is required as the steering rods 32 must be capable of angular displacement in more than one plane. The steering mechanism, as illustrated and described above, is mounted with respect to the car 11 to minimize steering action on a straight run should the car body roll or be displaced laterally or vertically for one reason or another. To minimize steering under these conditions the steering rods 32 are maintained parallel to one another and lie in the same horizontal plane when the car body is in normal position. Consequently, lateral or vertical body displacement during operation will not change the parallelism of the steering rods 32 although they may become inclined with respect to the horizontal plane of the rails during operation. When the car body rolls, the steering rods 32 will no longer remain parallel with respect to one another, insofar as the single horizontal plane initially including the same is concerned. The journal box end of a steering rod 32 on one side of the car may go down while the journal box end of the steering rod 32 on the other side of the car may go up. The rise of one steering rod equals the fall of the other and the angular displacement, although being in opposite directions, will be of the same magnitude with respect to each of the steering rods and the foreshortening of the rods will be equal on both sides of the car. Consequently, the axle will not be steered as a result of car body roll. While the axle may possibly move fore and aft to a certain extent with respect to the car body, it nevertheless will retain its transverse angular relation with the car body and no steering action will occur.

In the event that the car body is displaced laterally and at the same time rolls, the rise and fall of the steering rods 32 on both sides of the car are not exactly equal and opposite to one another. Under these circumstances it may be desirable to over-compensate for the purpose of stabilizing the car body by providing a slight amount of steering which acts against the displacement of the car body to urge the same into the normal position. To properly achieve a compensating effect, the angles between the longitudinal center line of the axle and the longitudinal center lines of the steering rods 32 should be 90° or less, this angle being measured in horizontal planes. Furthermore, the angles between the center lines of the bell cranks 27 and the center lines of the steering rods 32, measured in vertical planes, should be 90° or more. The deviations from 90° should be equal on both sides of the car or as close to equal as is mechanically feasible. In any case the angular deviations from 90° will be relatively small in magnitude as the larger the deviation from 90° the more marked the amount of steering resulting from car body displacement.

Due to the uncomplicated nature of the axle steering mechanism of the present invention, the above discussed variations in angular interconnections of the various elements may be readily brought about without over-complicating the structural features of the mechanism. An additional important advantage of the axle steering mechanism resides in the arrangement of interconnected elements all of which are readily available for maintenance purposes from the outside of the cars to which they are attached. As a result it is unnecessary to obtain access under the cars in order to service the steering mechanism and maintenance time is reduced. Installation of the axle steering mechanism is simple due to the design and manner of interconnecting its various parts.

Obviously many modifications and variations of the invention as hereinbefore set forth may be made without departing from the spirit and scope thereof, and therefore only such limitations should be imposed as are indicated in the appended claims.

We claim:

1. An axle steering mechanism associated with articulated vehicles, said mechanism including laterally spaced transversely directed steering links pivotally attached at their inner ends to a means connected with a first vehicle in substantially non-rotative relation with the longitudinal axis thereof and movable with said first vehicle relative to a second vehicle, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle.

2. An axle steering mechanism associated with articulated vehicles, said mechanism including laterally spaced transversely directed steering links pivotally attached at their inner ends to a means connected with a first vehicle in substantially non-rotative relation with the longitudinal axis thereof and movable with said first vehicle relative to a second vehicle, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle, the ends of said steering rods at their points of pivotal attachment with said axle defining an angle with said axle which when measured in a horizontal plane is no greater than 90°, the ends of said steering rods at their points of pivotal attachment with said steering levers defining an angle with said steering levers which when measured in a vertical plane is no less than 90°.

3. An axle steering mechanism associated with articulated vehicles, said mechanism including laterally spaced transversely directed steering links pivotally attached at their inner ends to a means connected with a first vehicle in substantially non-rotative relation with the longitudinal axis thereof and movable with said first vehicle relative to a second vehicle, said means including a male coupling member mounted on said second vehicle for pivoting in a substantially horizontal plane and coupled with said first vehicle for movement therewith relative to said second vehicle, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle.

4. An axle steering mechanism associated with articulated vehicles, said mechanism including laterally spaced transversely directed steering links pivotally attached at their inner ends to a means connected with a first vehicle in substantially non-rotative relation with the longitudinal axis thereof and movable with said first vehicle relative to a second vehicle, said means including a male coupling member mounted on said second vehicle and coupled with said first vehicle for movement therewith relative to said second vehicle, said male coupling member being pivotally connected to said second vehicle for movement relative thereto in a substantially horizontal plane and being provided with a rearwardly extending integral arm to which the inner ends of said steering links are pivotally attached, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle.

5. An axle steering mechanism associated with articulated vehicles, said mechanism including laterally spaced transversely directed steering links pivotally attached at their inner ends to a means fixedly connected with a first vehicle and movable therewith relative to a second vehicle, coupling members on said vehicles pivotally interconnected with one another, the coupling member of said first vehicle being provided with an outwardly extending integral arm defining said means to which the inner ends of said steering links are pivotally attached, steering levers pivotally attached to each of the outer ends of said steering links, said steering levers being further pivotally mounted on said second vehicle, and steering rods pivotally attached to each of said steering levers, said steering rods being further pivotally attached to an axle of said vehicle at points spaced from one another near each end of said axle.

6. An axle steering mechanism associated with articulated vehicles, said mechanism including laterally spaced transversely directed steering links pivotally attached at their inner ends to a means connected with a first vehicle in substantially non-rotative relation with the longitudinal axis thereof while being connected to a second vehicle for pivoting in a substantially horizontal plane relative thereto, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle, said steering links being transversely aligned and said steering rods being substantially parallel when the center lines of said vehicles coincide.

7. An axle steering mechanism associated with articulated vehicles, said mechanism including laterally spaced transversely directed steering links pivotally attached at their inner ends to a means connected with a first vehicle in substantially non-rotative relation with the longitudinal axis thereof while being connected to a second vehicle for pivoting in a substantially horizontal plane relative thereto, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle, said steering levers each being in the form of a bell crank having a vertically directed body portion pivotally attached to said second vehicle, the bottom portion of said bell crank being provided with an outwardly directed crank arm pivotally attached to an outer end of a steering lever, the top portion of said bell crank being provided with an outwardly directed crank arm of a length greater than said first named crank arm, said top crank arm being pivotally attached to an end of a steering rod to move the same a distance greater than the distance moved by the steering link attached to the bottom crank arm.

8. An axle steering mechanism associated with articulated vehicles, said mechanism including laterally spaced transversely directed steering links pivotally attached at their inner ends to a means connected with a first vehicle in substantially non-rotative relation with the longitudinal axis thereof while being connected to a second vehicle for pivoting in a substantially horizontal plane relative thereto, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle, said steering links being transversely aligned and said steering rods being substantially parallel when the center lines of said vehicles coincide, said steering levers each being in the form of a bell crank having a vertically directed body portion pivotally attached to said second vehicle, the bottom portion of said bell crank being provided with an outwardly directed crank arm pivotally attached to an outer end of a steering lever, the top portion of said bell crank being provided with an outwardly directed crank arm of a length greater than said first named crank arm, said top crank arm being pivotally attached to an end of a steering rod to move the same a distance greater than the distance moved by the steering link attached to the bottom crank arm.

9. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering links pivotally attached at their inner ends to a means connected with said first car in substantially non-rotative relation with the longitudinal axis thereof and movable with said first car relative to said second car, steering levers pivotally attached to each of the outer ends of said steering links, said steering levers being further pivotally mounted on said second car, and steering rods pivotally attached to each of said steering levers, said steering rods being further pivotally attached to said axle outwardly of each of the wheels carried thereby.

10. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering links pivotally attached at their inner ends to a means connected with said first car in substantially non-rotative relation with the longitudinal axis thereof and movable therewith relative to said second car, said means including a male coupling member mounted on said second car and coupled with said first car for movement therewith relative to said second car, said male coupling member being pivotally connected to said second car and being provided with a rearwardly extending integral arm to which the inner ends of said steering links are pivotally attached, steering levers pivotally attached to each of the outer ends of said steering links, said steering levers being further pivotally mounted on said second car, and steering rods pivotally attached to each of said steering levers, said steering rods being further pivotally attached to said journal boxes.

11. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering links pivotally attached at their inner ends to a means fixedly connected with said first car and movable therewith relative to said second car, coupling members on said cars pivotally interconnected with one another, the coupling member of said first car being provided with an outwardly extending integral arm defining said means to which the inner ends of said steering links are pivotally attached, steering levers pivotally attached to each of the outer ends of said steering links, said steering levers being further pivotally mounted on said second car, and steering rods pivotally attached to each of said steering levers, said steering rods being further pivotally attached to said journal boxes.

12. In an articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering links pivotally attached at their inner ends to a means connected with said first car in substantially non-rotative relation with the longitudinal axis thereof while being connected to said second car for pivoting in a substantially horizontal plane relative thereto, steering levers pivotally attached to each of the outer ends of said steering links, said steering levers being further pivotally mounted on said second car, and steering rods pivotally attached to each of said steering levers, said steering rods being further pivotally attached to said journal boxes, said steering links being transversely aligned and said steering rods being substantially parallel when the center lines of said cars coincide.

13. An articulated train comprising at least two interconnected single axle cars, a first car being supported in load-bearing relation by a second car provided near the supporting end thereof with a single transverse axle carrying laterally spaced wheels and journal boxes outwardly of said wheels, the provision of an axle steering mechanism including laterally spaced transversely directed steering links pivotally attached at their inner ends to a means connected with said first car in substantially non-rotative relation with the longitudinal axis thereof while being connected to said second car for pivoting in a substantially horizontal plane relative thereto, steering levers pivotally attached to each of the outer ends of said steering links, said steering levers being further pivotally mounted on said second car, and steering rods pivotally attached to each of said steering levers, said steering rods being further pivotally attached to said journal boxes, said steering levers each being in the form of a bell crank having a vertically directed body portion pivotally attached to said second car, the bottom portion of said bell crank being provided with an outwardly directed crank arm pivotally attached to an outer end of a steering link, the top portion of said bell crank being provided with an outwardly directed crank arm of a length greater than said first named crank arm, said top crank arm being pivotally attached to an end of a steering rod to move the same a distance greater than the distance moved by the steering link attached to the bottom crank arm.

14. An axle steering mechanism associated with articulated vehicles, said mechanism including laterally spaced transversely directed steering links pivotally attached at their inner ends to a means connected with a first vehicle in substantially non-rotative relation with the longitudinal axis thereof while being connected to a second vehicle for pivoting in a substantially horizontal plane relative thereto, steering levers pivotally attached to each of the outer ends of said steering links, said steering levers being further pivotally mounted on said second vehicle, and steering rods pivotally attached to each of said steering levers, said steering rods being further pivotally attached to an axle of said second vehicle at points spaced from one another near each end of said axle, said steering rods being adapted for at least partial universal movement with respect to said steering links and said axle.

15. An axle steering mechanism carried by articulated vehicles, said mechanism including a pair of oppositely and transversely directed steering links pivotally connected at their innermost ends to vehicle interconnecting means detachably connected to a first vehicle against substantial rotation relative to the longitudinal axis thereof while being pivotally connected to a second vehicle for movement with said first vehicle relative to said second vehicle, transversely spaced steering levers mounted on said second vehicle for pivotal movement relative thereto, each of the outermost ends of said steering links being pivotally attached to a steering lever to pivot the same relative to said second vehicle upon relative movement between said vehicles, and a pair of steering rods each of which is pivotally attached to a separate steering lever at one end thereof while being pivotally attached at the other end thereof to an axle of said second vehicle near an end thereof to steer said axle in response to movement of said first vehicle relative to said second vehicle.

16. An axle steering mechanism carried by articulated vehicles, said mechanism including a pair of oppositely and transversely directed steering links pivotally connected at their innermost ends to vehicle interconnecting means detachably connected to a first vehicle against substantial rotation relative to the longitudinal axis thereof while being pivotally connected to a second vehicle for movement with said first vehicle relative to said second vehicle, transversely spaced steering levers mounted on said second vehicle for pivotal movement each about a vertical axis relative thereto, each of the outermost ends of said steering links being pivotally attached to a steering lever to pivot the same relative to said second vehicle upon relative movement between said vehicles, and a pair of steering rods each of which is pivotally attached to a separate steering lever at one end thereof while being pivotally attached at the other end thereof to an axle of said second vehicle near an end thereof to steer said axle in response to movement of said first vehicle relative to said second vehicle, said steering rods being adapted for at least partial universal movement relative to said steering levers and said axle.

References Cited in the file of this patent

UNITED STATES PATENTS

| | | |
|---|---|---|
| 1,064,167 | Pintner | June 10, 1913 |
| 2,087,377 | Geissen | July 20, 1937 |
| 2,746,398 | Tomas | May 22, 1956 |
| 2,756,688 | Furrer | July 31, 1956 |